US012647879B2

(12) United States Patent
Neubacher et al.

(10) Patent No.: US 12,647,879 B2
(45) Date of Patent: Jun. 2, 2026

(54) METHOD FOR REALIZING NETWORK SELECTION BY A USER EQUIPMENT BEING IN A RADIO ENVIRONMENT COMPRISING A PLURALITY OF RADIO CELLS OF A PLURALITY OF MOBILE COMMUNICATION NETWORKS

(71) Applicant: Deutsche Telekom AG, Bonn (DE)

(72) Inventors: Andreas Neubacher, Korneuburg (AT); Kurt Bischinger, Vienna (AT)

(73) Assignee: Deutsche Telekom AG, Bonn (DE)

( * ) Notice: Subject to any disclaimer, the term of this patent is extended or adjusted under 35 U.S.C. 154(b) by 395 days.

(21) Appl. No.: 18/253,597

(22) PCT Filed: Nov. 2, 2021

(86) PCT No.: PCT/EP2021/080396
§ 371 (c)(1),
(2) Date: May 19, 2023

(87) PCT Pub. No.: WO2022/106192
PCT Pub. Date: May 27, 2022

(65) Prior Publication Data
US 2024/0007939 A1 Jan. 4, 2024

(30) Foreign Application Priority Data
Nov. 23, 2020 (EP) ..................................... 20209263

(51) Int. Cl.
*H04W 48/18* (2009.01)
*H04W 48/20* (2009.01)
*H04W 84/04* (2009.01)

(52) U.S. Cl.
CPC ........... *H04W 48/18* (2013.01); *H04W 48/20* (2013.01); *H04W 84/042* (2013.01)

(58) Field of Classification Search
CPC ... H04W 36/08; H04W 36/24; H04W 36/362; H04W 48/14; H04W 48/16; H04W 48/18;
(Continued)

(56) References Cited

U.S. PATENT DOCUMENTS 11,184,826 B2 * 11/2021 Lee ........................ H04W 48/16
11,985,565 B2 * 5/2024 Kim .................. H04W 36/0058
(Continued)

FOREIGN PATENT DOCUMENTS

CN 104541562 A 4/2015
EP 2978264 A2 1/2016
JP 2008-543136 A 11/2008

OTHER PUBLICATIONS

U.S. Appl. No. 18/037,810, filed May 19, 2023.
(Continued)

*Primary Examiner* — Jean A Gelin
(74) *Attorney, Agent, or Firm* — Leydig, Voit & Mayer, Ltd.

(57) ABSTRACT

A method for realizing network selection by a user equipment includes the following steps: in a first step, suitable radio cells of a considered radio access technology are determined by the user equipment based on a cell selection criterion regarding the considered radio access technology; and in a second step, upon initiating network selection according to an automatic network selection mode, only such mobile communication networks corresponding to suitable radio cells of the considered radio access technology are considered for network selection of the user equipment that have or correspond to reception conditions meeting or exceeding an enhanced network selection criterion.

10 Claims, 1 Drawing Sheet

(58) Field of Classification Search
CPC ... H04W 48/20; H04W 84/042; H04W 24/08;
H04W 88/06; H04W 60/00
USPC .......................................................... 370/329
See application file for complete search history.

(56) References Cited

U.S. PATENT DOCUMENTS

| | | | |
|---|---|---|---|
| 12,010,628 B2 * | 6/2024 | Sabouri-Sichani ... | H04W 24/10 |
| 2005/0176385 A1 * | 8/2005 | Stern-Berkowitz ... | H04W 36/18 |
| | | | 455/73 |
| 2006/0264215 A1 | 11/2006 | Ekstedt et al. | |
| 2008/0108353 A1 * | 5/2008 | Lee ...................... | H04J 11/0093 |
| | | | 455/437 |
| 2009/0143065 A1 * | 6/2009 | Mattila ............... | H04L 41/5009 |
| | | | 370/328 |
| 2010/0197281 A1 * | 8/2010 | Bennett .............. | H04W 12/069 |
| | | | 455/414.1 |
| 2010/0216469 A1 | 8/2010 | Yi et al. | |
| 2012/0258726 A1 * | 10/2012 | Bansal ................. | H04L 67/141 |
| | | | 709/228 |
| 2013/0053038 A1 * | 2/2013 | Lee ..................... | H04W 36/324 |
| | | | 455/436 |
| 2013/0316699 A1 * | 11/2013 | Jheng ................... | H04W 48/18 |
| | | | 455/423 |
| 2014/0036874 A1 | 2/2014 | Jeong et al. | |
| 2014/0153546 A1 * | 6/2014 | Kim ...................... | H04W 48/18 |
| | | | 370/332 |
| 2014/0233386 A1 * | 8/2014 | Jamadagni ............ | H04W 36/22 |
| | | | 370/235 |
| 2015/0156690 A1 | 6/2015 | Futaki | |
| 2015/0215832 A1 * | 7/2015 | Fitzpatrick ............ | H04W 48/14 |
| | | | 455/426.1 |
| 2015/0249950 A1 * | 9/2015 | Teyeb ................... | H04W 48/04 |
| | | | 455/437 |
| 2016/0234672 A1 * | 8/2016 | Cho ...................... | H04W 24/02 |
| 2016/0255534 A1 * | 9/2016 | Bergström ............ | H04W 76/18 |
| | | | 370/230.1 |
| 2018/0049087 A1 | 2/2018 | Lee et al. | |
| 2020/0367201 A1 * | 11/2020 | Cai ....................... | H04W 48/18 |
| 2022/0345970 A1 * | 10/2022 | Kim ...................... | H04W 76/10 |

OTHER PUBLICATIONS

"3rd Generation Partnership Project; Technical Specification Group Radio Access Network; User Equipment (UE) procedures in idle mode and procedures for cell reselection in connected mode (Release 16)", 3GPP Draft; 25304-G00, 3rd Generation Partnership Project (3GPP), Mobile Competence Centre; 650, Route Des Lucioles ; F-06921 Sophia-Antipolis Cedex; France, Jul. 18, 2020 (Jul. 18, 2020), XP051909443, Retrieved from the Internet: URL:https://ftp. 3gpp.org/3guinternal/3GPPultimate versions to be transposed/ sentToDpc/25304~g00.zip 25304-900.doc [retrieved on Jul. 18, 2020].

3rd Generation Partnership Project, Technical Specification Group Radio Access Network; Functions related to Mobile Station (MS) in idle mode and group receive mode, Release 16,3GPP TS43.022, V16.0.0, Jul. 19, 2020, pp. 6-17.

3rd Generation Partnership Project, Technical Specification Group Radio Access Network; Evolved Universal Terrestrial Radio Access (E-UTRA); User Equipment (UE) procedures in idle mode, Release 16, 3GPP TS 36.304, V16.2.0, Oct. 2, 2020, pp. 17-24.

3rd Generation Partnership Project, Technical Specification Group Radio Access Network; NR; User Equipment (UE) procedures in Idle mode and RRC Inactive state, Release 16, 3GPP TS 38.304, V16.2.0, Oct. 5, 2020, pp. 15-20.

3rd Generation Partnership Project, Technical Specification Group Core Network and Terminals; Non Access-Stratum (NAS) functions related to Mobile Station (MS) in idle mode, Release 16, 3GPP TS 23.122, V16.7.0, Sep. 24, 2020, pp. 29-36.

* cited by examiner

METHOD FOR REALIZING NETWORK SELECTION BY A USER EQUIPMENT BEING IN A RADIO ENVIRONMENT COMPRISING A PLURALITY OF RADIO CELLS OF A PLURALITY OF MOBILE COMMUNICATION NETWORKS

CROSS-REFERENCE TO PRIOR APPLICATIONS

This application is a U.S. National Phase application under 35 U.S.C. § 371 of International Application No. PCT/EP2021/080396, filed on Nov. 2, 2021, and claims benefit to European Patent Application No. EP 20209263.1, filed on Nov. 23, 2020. The International Application was published in English on May 27, 2022 as WO 2022/106192 A1 under PCT Article 21(2).

FIELD

The present invention relates to a method for realizing network selection by a user equipment being in a radio environment comprising a plurality of radio cells of a plurality of mobile communication networks, each one of these radio cells being associated, respectively, to at least one mobile communication network of the plurality of mobile communication networks, wherein the user equipment measures or detects reception conditions regarding the plurality of radio cells, and subsequently selects and/or registers to a mobile communication network out of the plurality of mobile communication networks.

Furthermore, the present invention relates to a user equipment for realizing network selection by a user equipment being in a radio environment comprising a plurality of radio cells of a plurality of mobile communication networks, each one of these radio cells being associated, respectively, to at least one mobile communication network of the plurality of mobile communication networks, wherein the user equipment is configured to measure or to detect reception conditions regarding the plurality of radio cells, and is configured to subsequently select and/or register to a mobile communication network out of the plurality of mobile communication networks.

Additionally, the present invention relates to a system or a mobile communication network for realizing network selection by a user equipment being in a radio environment comprising a plurality of radio cells of a plurality of mobile communication networks, each one of these radio cells being associated, respectively, to at least one mobile communication network of the plurality of mobile communication networks, wherein the user equipment is configured to measure or to detect reception conditions regarding the plurality of radio cells, and is configured to subsequently select and/or register to a mobile communication network out of the plurality of mobile communication networks.

Furthermore, the present invention relates to a program and to a computer-readable medium for realizing network selection by a user equipment being in a radio environment comprising a plurality of radio cells of a plurality of mobile communication networks according to a inventive method according to the invention.

BACKGROUND

In currently deployed mobile communication networks, a user equipment or mobile station typically experiences a radio environment (i.e. the different radio frequency signals that the user equipment—at its current position or location—is potentially able to receive on different frequencies and/or frequency bands and/or at different points in time or time intervals or time slots) comprising a plurality of radio cells that are at least detectable and/or receivable by the respective user equipment or mobile station. One such radio cell is typically provided by a base station entity, i.e. an antenna arrangement of a specific base station entity emits radio frequency signals such that the user equipment, at its current position or location, is able to receive such radio frequency signals with a sufficient quality, typically with a sufficient signal to noise ratio. If this is the case, the radio environment of the user equipment comprises the considered radio cell. A plurality of radio cells (i.e. of base station entities) are typically part of a mobile communication network being a cellular mobile communication network. Hence, the plurality of radio cells of the radio environment of the user equipment are typically part of a plurality of mobile communication networks, typically each one of these radio cells being associated, respectively, to either one mobile communication network of the plurality of mobile communication networks or to more than one mobile communication network of the plurality of mobile communication networks. Hence, via selecting a radio cell (out of the plurality of radio cells present or receivable of the radio environment at the considered position or location of the user equipment), the user equipment also selects a mobile communication network (that is associated to that radio cell). However, before a mobile communication network is considered as a network selection candidate (i.e. a candidate mobile communication network) at all, the user equipment needs to find a suitable radio cell of a mobile communication network or public land mobile network to camp on. The criteria for a radio cell to be considered as suitable radio cell (to camp on), is dependent on the considered network technology (or radio access technology) being defined in or via the relevant standardization documents, mostly referred to 3GPP (third generation partnership project) documents.

In presently known mobile communication networks. i.e. in networks in compliance with the currently defined standards or standard documents, a number of drawbacks might occur: In bad or unfavorable radio coverage conditions (of a user equipment), the 3GPP defined order or prioritization of how mobile communication networks are being selected to obtain communication services or any service is not suitable in all relevant situations. For example, in some situations the field strength or quality (of the radio signal or a plurality of radio signals) of a radio cell (of the user equipment's radio environment) is not considered in the network selection process (PLMN selection process), leading to user equipments not being able to receive and/or transmit data subsequent to the initial network selection process (PLMN selection process). Such situations include cases where some user equipments may fail obtaining data services, even though the selected public land mobile network fulfilled the cell selection criteria for considering the respective mobile communication network (public land mobile network) in the network selection (or PLMN selection) process. In particular, in case that a user equipment is in or at an unfavorable position, the applicable cell selection criteria (e.g. "RX Access Lev min" criteria) might be barely fulfilled, conducting the user equipment to consider the respective public land mobile network for PLMN selection, but in fact due to, e.g., fading or local interference at the location of the user equipment, data transport between the network and the user equipment may fail subsequently. Such cases occur, especially regarding cellular user equipments or devices for internet-of-things or M2M (Machine to Machine) communications services, which devices are often used in a stationary manner (e.g. meters or all kinds of sensors or the like) and in case of unfavorable radio (reception) conditions, this kind of problem is likely to subsist permanently for such user equipments, leading to the situation of such a user equipment (especially if in automatic network selection mode) being stuck on a PLMN, while not being able to transmit data. In absence of an advanced application logic, such user equipments may currently need manual interventions on site since they are likewise not reachable anymore; hence such user equipments might need to be switched or reconfigured to manual network selection (PLMN Selection) mode, and an appropriate mobile communication network might need to be selected permanently, potentially leading to further difficulties in selecting the appropriate mobile communication network in case of network modifications and/or local modification of the respective base station entities involved. Such interventions might be costly for users of such user equipments (especially internet-of-things devices but not necessarily), and due to the use of manual network selection mode, the advantages of an automatic network selection, e.g. re-selection to another mobile communication network in case of an outage of the registered network (registered public land mobile network, RPLMN), are not possible to realize anymore.

SUMMARY

In an exemplary embodiment, the present invention provides a method for realizing network selection by a user equipment in a radio environment comprising a plurality of radio cells of a plurality of mobile communication networks. Each one of these radio cells is associated, respectively, to at least one mobile communication network of the plurality of mobile communication networks. The user equipment measures or detects reception conditions regarding the plurality of radio cells, and subsequently selects and/or registers to a mobile communication network out of the plurality of mobile communication networks. Regarding cell selection by the user equipment a cell selection criterion is defined, wherein a radio cell of a respective considered radio access technology is considered to be a suitable radio cell in case that corresponding reception conditions, as measured by the user equipment, meet or exceed the cell selection criterion regarding the respective considered radio access technology. Regarding network selection by the user equipment a predefined enhanced network selection criterion is applicable. The method comprises the following steps: in a first step, suitable radio cells of a considered radio access technology are determined by the user equipment based on the cell selection criterion regarding the considered radio access technology; and in a second step, upon initiating network selection according to an automatic network selection mode, only such mobile communication networks corresponding to suitable radio cells of the considered radio access technology are considered for network selection of the user equipment that have or correspond to reception conditions meeting or exceeding the enhanced network selection criterion.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
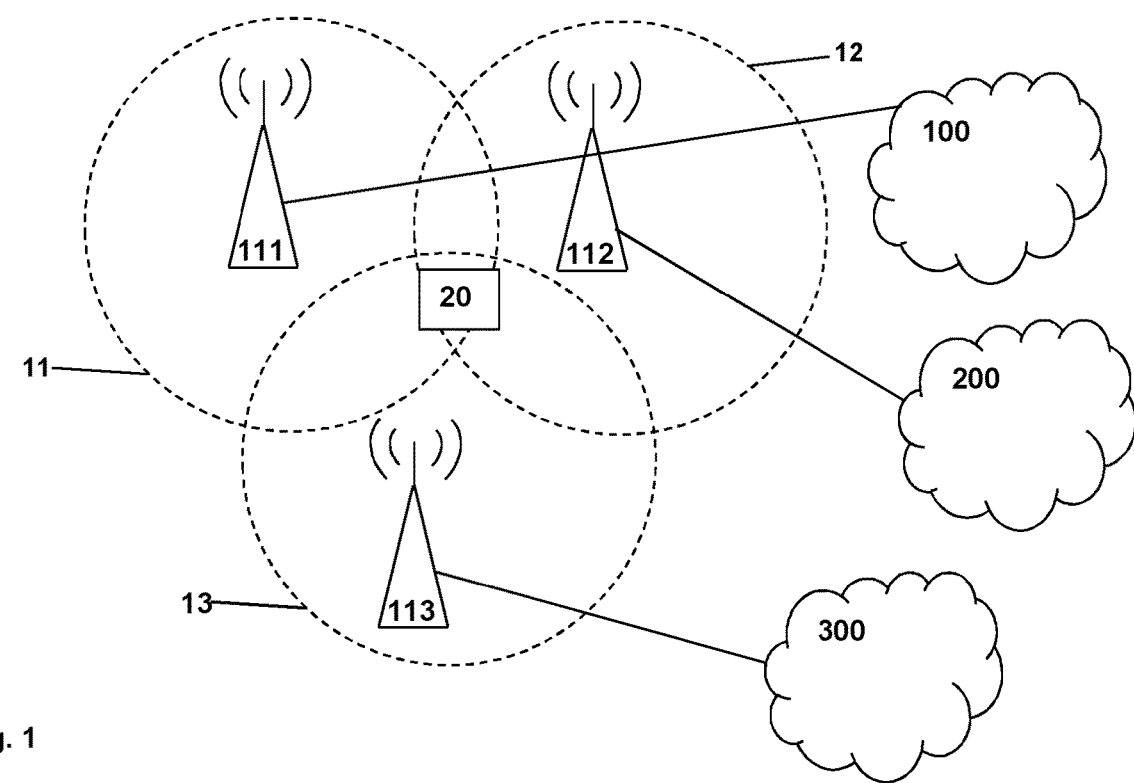
FIG. 1 schematically illustrates a user equipment in a radio environment comprising a plurality of radio cells of a plurality of mobile communication networks.

Exemplary embodiments of the present invention provide a technically simple, effective and cost effective solution for an enhanced network selection by a user equipment being in a radio environment comprising a plurality of radio cells of a plurality of mobile communication networks. Exemplary embodiments of the present invention further provide a corresponding user equipment, system or mobile communication network, and a corresponding program and computer-readable medium.

In an exemplary embodiment, the present invention provides a method for realizing network selection by a user equipment being in a radio environment comprising a plurality of radio cells of a plurality of mobile communication networks, each one of these radio cells being associated, respectively, to at least one mobile communication network of the plurality of mobile communication networks, wherein the user equipment measures or detects reception conditions regarding the plurality of radio cells, and subsequently selects and/or registers to a mobile communication network out of the plurality of mobile communication networks, wherein regarding cell selection by the user equipment a cell selection criterion is defined, wherein a radio cell of a considered radio access technology is considered to be a suitable radio cell in case that the corresponding reception conditions, as measured by the user equipment, correspond to or exceed the cell selection criterion regarding the considered radio access technology, wherein regarding network selection by the user equipment a predefined enhanced network selection criterion is able to be applied, wherein the method comprises the following steps:

in a first step, suitable radio cells of a considered radio access technology are determined by the user equipment based on the cell selection criterion regarding the considered radio access technology, in a second step, upon initiating network selection according to the automatic network selection mode, only such mobile communication networks corresponding to suitable radio cells of the considered radio access technology are considered for network selection of the user equipment that have or correspond to reception conditions corresponding to or exceeding the enhanced network selection criterion.

It is thereby advantageously possible according to the present invention that—via being able to apply the predefined enhanced network selection criterion instead of applying the conventionally used process (i.e. taking into consideration all suitable radio cells or their corresponding mobile communication networks)—network selection is able to be performed in an optimized manner, especially leading to avoid problems related to the use of the conventionally used network selection process such as the ones mentioned above.

Conventionally, cell selection criteria are used for radio cells to be considered suitable radio cells (i.e. for a user equipment to camp on), and these cell selection criteria are typically dependent on the considered network technology (or radio access technology) used, i.e. the radio access technology that both the user equipment and the radio cell are using. Typically, different generations of mobile communication systems (i.e. different radio access technologies) are considered, most often including one, all or a subset of the following: 2G, 3G, 4G and 5G technology (i.e. second generation mobile communication systems (GSM, global system for mobile communications), third generation mobile communication systems (UMTS, Universal Mobile Tele-communications System including its radio technology UTRA, UMTS Terrestrial Radio Access), fourth generation mobile communication systems (LTE, long term evolution including its radio technology E-UTRA, evolved UMTS Terrestrial Radio Access), and fifth generation mobile communication systems (5GS, 5G system including its radio technology NR, New Radio)), but further or additional or alternative radio access technologies are not excluded according to the present invention.

In the following, the conventionally used cell selection criteria (or cell selection criterion) are (is) provided according to the different, currently most often deployed radio access technologies:

GSM Network: For a GSM network, the criterion among others to access or camp on a radio cell is given in 3GPP TS 43.022 "Functions related to Mobile Station (MS) in idle mode and group receive mode", especially version V16.0.0 (2020-07), Section 3.6;

The parameter RXLEV_ACCESS_MIN, which is broadcast as system information, and is related to the minimum signal that the operator wants the network to receive when being initially accessed by an MS.

UTRA Network: For a UTRA Network, the criteria among others to access or camp on a cell are given in 3GPP TS 25.304 "User Equipment (UE) procedures in idle mode and procedures for cell reselection in connected mode", especially version V16.0.0 (2020-07), Section 5.2.3.1.2: the cell selection criterion S is fulfilled when, for FDD cells, Srxlev>0 and Squal>0, and, for TDD cells, Srxlev>0, where $$Squal=Q_{qualmeas}-(Qqualmin+QqualminOffset)-Qoffsettemp, \text{ and}$$

$$Srxlev=Q_{rxlevmeas}-(Qrxlevmin+QrxlevminOffset)-Pcompensation-Qoffset_{temp},$$

where the signalled values QqualminOffset and QrxlevminOffset are only applied when a cell is evaluated for cell selection as a result of a periodic search for a higher priority PLMN while camped normally in a VPLMN (visited public land mobile network).

LTE and NB-IoT Networks/E-UTRA Networks: For LTE and NB-IoT Networks the criteria among others to access or camp on a cell are given in 3GPP TS 36.304 "User Equipment (UE) procedures in idle mode", especially version V16.1.0 (2020-07), Section 5.2.3.2 and 5.2.3.2a:

Cell Selection Criterion for LTE: The cell selection criterion S in normal coverage is fulfilled when: Srxlev>0 AND Squal>0 where:

$$Srxlev=Qrxlevmeas-(Qrxlevmin+Qrxlevminoffset)-Pcompensation-Qoffsettemp$$

$$Squal=Qqualmeas-(Qqualmin+Qqualminoffset)-Qoffsettemp$$

Cell Selection Criterion for NB-IoT: If the measurements are performed on the non-anchor carrier and UE meets the requirements specified in TS 36.133 the cell selection criterion S is fulfilled when: Srxlev>0, else, the cell selection criterion S is fulfilled when: Srxlev>0 AND Squal>0, where:

$$Srxlev=Qrxlevmeas-Qrxlevmin-Pcompensation-Qoffsettemp$$

$$Squal=Qqualmeas-Qqualmin-Qoffsettemp.$$

NR Network: For a NR Network the criteria among others to access or camp on a cell is given in 3GPP TS 38.304 "User Equipment (UE) procedures in Idle mode and RRC Inactive state", especially version V16.1.0 (2020-07), Section 5.2.3.2: the cell selection criterion S is fulfilled when: Srxlev>0 AND Squal>0 where:

$$Srxlev=Qrxlevmeas-(Qrxlevmin+Qrxlevminoffset)-Pcompensation-Qoffsettemp$$

$$Squal=Qqualmeas-(Qqualmin+Qqualminoffset)-Qoffsettemp.$$

Once the user equipment (or, more specifically, the so-called AS, Access Stratum part of the user equipment) has read one or several PLMNs, i.e. one or several radio cells, which may belong to different mobile communication networks or public land mobile networks, the radio cells or public land mobile networks that passed the cell selection criterion (to be, respectively, applied in view of the potentially different radio access technologies) are reported to the so-called NAS, Non Access Stratum, (or NAS part of the user equipment) for the subsequent stage (or step) of network selection. Typically, this reporting includes also the transmission of the respective field strength values (measured by the user equipment) such as, e.g., the RSRP (Reference Signals Received Power) value. Typically according to the conventionally known and used standardized user equipment behavior, respective field strength values (as measured by the user equipment) are not reported to the NAS regarding such radio cells that not only fulfill the cell selection criterion (to be applied, respectively, regarding the considered radio access technology) but that also fulfill a so-called high quality criterion; however, also regarding such high quality radio cells, the AS indicates their high quality property (or the fact these radio cells have been measured to fulfill the high quality criterion) to the NAS, and hence, at least implicitly, also transmits a field strength value regarding these radio cells.

In the following, the conventionally used high quality criteria (or high quality criterion) are (is) provided according to the different, currently most often deployed radio access technologies:

GSM: For GSM the High Quality Criterion is given in 3GPP TS 43.022 "Functions related to Mobile Station (MS) in idle mode and group receive mode", especially version V16.0.0 (2020-07), Section 4.4.3 to be as follows: A PLMN shall be understood to be received with high quality signal if the signal level is above-85 dBm.

UTRAN: For UTRA the High Quality Criterion is given in 3GPP TS 25.304 "User Equipment (UE) procedures in idle mode and procedures for cell reselection in connected mode", especially version V16.0.0 (2020-07), Section 5.1.2.2 to be as follows: For an FDD cell, the measured primary CPICH RSCP value shall be greater than or equal to −95 dBm; for a TDD cell, the measured P-CCPCH RSCP shall be greater than or equal to −84 dBm.

E-UTRAN: For LTE/NB-IoT the High Quality Criterion is given in 3GPP TS 36.304 "User Equipment (UE) procedures in idle mode", especially version V16.1.0 (2020-07), Section 5.1.2.2 to be as follows: For an E-UTRAN and NB-IoT cell, the measured RSRP value shall be greater than or equal to −110 dBm.

NR: For NR the High Quality Criterion is given in 3GPP TS 38.304 "User Equipment (UE) procedures in Idle mode and RRC Inactive state", especially version V16.1.0 (2020-07), Section 5.1.1.2 to be as follows: For an NR cell, the measured RSRP value shall be greater than or equal to −110 dBm.

Based on the reporting (especially by the AS part of the user equipment to the NAS part of the user equipment), the actual network selection is able to take place. Conventionally, at the network selection stage, all radio cells judged (in the preceding cell selection stage) to be suitable radio cells are taken into consideration.

In a simplified manner, it can be said that, at switch on or recovery from lack of coverage, either the last registered PLMN or an equivalent PLMN (to the last registered PLMN) or as an option configured on the SIM, subscriber identity module, of the user equipment, either the HPLMN (home public land mobile network) or the highest priority EHPLMN (equivalent home public land mobile network) that is available is selected. Regarding re-selection, the simplified order for network selection is as follows:

i) either the HPLMN or the highest priority EHPLMN that is available, ii) each PLMN/access technology combination in the "User Controlled PLMN Selector with Access Technology" data file in the SIM (in priority order), iii) each PLMN/access technology combination in the "Operator Controlled PLMN Selector with Access Technology" data file in the SIM (in priority order) or stored in the user equipment (in priority order), iv) other PLMN/access technology combinations with received "high quality" signal in random order, v) other PLMN/access technology combinations in order of decreasing signal quality.

In greater detail, the selection of a (mobile communication) network (among the radio cells reported to be receivable, by the user equipment, with sufficient signal strength) in Automatic Network Selection Mode, is defined depending on the actual condition of the user equipment, especially whether the user equipment has been switched on or recovers from lack of coverage, or whether a re-selection has been triggered by the user (of the user equipment), which is provided as follows:

At switch on or recovery from lack of coverage, the user equipment or mobile station selects the registered PLMN (RPLMN) or equivalent PLMN, i.e. the ERPLMN. As an alternative option to this, if the user equipment or mobile station is in automatic network selection mode and it finds coverage of an EHPLMN (HPLMN or an equivalent PLMN to the HPLMN), the user equipment or mobile station may register to that EHPLMN and not return to the registered PLMN or equivalent PLMN. The operator (of the HPLMN of the user equipment) shall be able to control by SIM configuration whether a user equipment or mobile station that supports this option is permitted to perform this alternative behavior. If the above network selection attempt is not successful, the user equipment or mobile station selects and attempts registration on other PLMN/access technology combinations, if available and allowable, in the following order:

i) either the HPLMN (if the EHPLMN list is not present or is empty) or the highest priority EHPLMN that is available (if the EHPLMN list is present);

ii) each PLMN/access technology combination in the "User Controlled PLMN Selector with Access Technology" data file in the SIM (in priority order);

iii) each PLMN/access technology combination in the "Operator Controlled PLMN Selector with Access Technology" data file in the SIM (in priority order) or stored in the ME (in priority order);

iv) other PLMN/access technology combinations with received high quality signal in random order;

v) other PLMN/access technology combinations in order of decreasing signal quality.

Reselection triggered by the User: At any time the user may request the user equipment or mobile station to initiate reselection and registration onto an available PLMN, according to the following procedure. In case of Automatic Network Selection Mode, the MS selects and attempts registration on PLMN/access technology combinations, if available and allowable, in all of its bands of operation in accordance with the following order;

i) the HPLMN (if the EHPLMN list is not present or is empty) or the highest priority EHPLMN that is available (if the EHPLMN list is present);

ii) PLMN/access technology combinations contained in the "User Controlled PLMN Selector with Access Technology" data file in the SIM (in priority order) excluding the previously selected PLMN/access technology combination;

iii) PLMN/access technology combinations contained in the "Operator Controlled PLMN Selector with Access Technology" data file in the SIM (in priority order) or stored in the user equipment (in priority order) excluding the previously selected PLMN/access technology combination;

iv) other PLMN/access technology combinations with the received high quality signal in random order excluding the previously selected PLMN/access technology combination;

v) other PLMN/access technology combinations, excluding the previously selected PLMN/access technology combination in order of decreasing signal quality or, alternatively, the previously selected PLMN/access technology combination may be chosen ignoring its signal quality;

vi) The previously selected PLMN/access technology combination.

In case the user equipment is in a VPLMN (visited public land mobile network), the user equipment or mobile station shall periodically attempt to obtain service on its HPLMN (if the EHPLMN list is not present or is empty) or one of its EHPLMNs (if the EHPLMN list is present) or a higher priority PLMN/access technology combinations listed in "user controlled PLMN selector" or "operator controlled PLMN selector" by scanning in accordance with the requirements that are applicable to i), ii) and iii) as defined above regarding the situation of "at switch on or recovery from lack of coverage".

In the case that the user equipment or mobile station has a stored "Equivalent PLMNs" list, the user equipment shall only select a PLMN if it is of a higher priority than those of the same country as the current serving PLMN which are stored in the "Equivalent PLMNs" list.

Hence, in conventional mobile communication networks the commonly applied or conducted (mobile communication) network selection behavior as defined in the 3GPP standardization documents has the draw back of mobile communication networks being selected (in the network selection stage) only based on "non-field-strength or quality-based" criteria, once a radio cell (or corresponding public land mobile network) has passed the cell selection criterion (or criteria) as indicated above. This is typically the root cause for the above mentioned problems and draw backs of the currently applied steps of both cell selection and network selection (especially at switch on or recovery from lack of coverage), i.e. a considered user equipment is just able to register (to a radio cell due to the applicable cell selection criterion being fulfilled), but subsequently fails in actually transmitting data, since such a user equipment might be in comparatively bad or unfavorable coverage conditions, e.g. experiencing fading or local interference at the user equipment location. Hence, despite the fact that other (mobile communication) networks with better conditions (or being able to provide an enhanced quality-of-service) would be available, such a user equipment remains stuck with the selected mobile communication network by applying the above mentioned conventionally known procedure.

According to the present invention, regarding network selection, by the user equipment, predefined enhanced network selection criterion is able to be applied, i.e. such a predefined enhanced network selection criterion is defined and used by the user equipment (or mobile station) when performing network selection (especially according to the automatic network selection mode), resulting in considering—at least initially for network selection purposes of the user equipment—only such mobile communication networks (corresponding to suitable radio cells of the considered radio access technology) that have or correspond to reception conditions corresponding to or exceeding the enhanced network selection criterion.

This means according to the present invention that, regarding cell selection, the conventionally known criteria are able to be applied (including reporting such suitable radio cells (and corresponding public land mobile networks) to the NAS); however, of all such reported suitable radio cells, only a subset is—at least initially—taken into consideration for network selection purposes (namely the subset fulfilling the enhanced network selection criterion).

Usually, applying the enhanced network selection criterion according to the present invention in the network selection process (i.e. the modification proposed to apply to the currently known and used network selection process) will have the effect—via considering, at least initially, only suitable radio cells corresponding to or exceeding the enhanced network selection criterion, i.e. having (as measured by the user equipment) a better signal level, e.g. a higher level of received radio signal strength or field strength—that possibly a smaller number of radio cells and of corresponding public land mobile networks are considered initially in the network selection stage (compared to the situation of the user equipment applying the conventionally known network selection). However, regarding such a possibly reduced number of selectable public land mobile networks (or mobile communication networks), fulfilling the enhanced network selection criterion, it is likely that the user equipment is not only able to just register to these radio cells but also to actually transmit (payload) data according to the intended application the user equipment is used for. Hence, according to the present invention, in a first step, the user equipment determines suitable radio cells (of a considered radio access technology) based on the (conventionally known) cell selection criterion regarding the considered radio access technology, and in a second step, during the network selection stage (especially according to the automatic network selection mode), only such mobile communication networks (corresponding to suitable radio cells of the considered radio access technology) are (at least initially) considered for network selection of the user equipment that have or correspond to reception conditions corresponding to or exceeding the enhanced network selection criterion.

According to the present invention, it is advantageously possible and preferred that the enhanced network selection criterion corresponds to a high quality criterion, wherein the high quality criterion corresponds to:

regarding GSM (global system for mobile communication) as radio access technology: the signal level associated with a high quality reception of a public land mobile network according to the 3GPP standardization.

regarding UTRAN (UMTS Terrestrial Radio Access Network), E-UTRA (evolved UMTS Terrestrial Radio Access), NB-IoT (narrow-band internet-of-things), or NR (new radio) in 5G systems: the respective signal level associated with the high quality criterion according to the 3GPP standardization, triggering the reporting, at the cell selection stage, of the respective public land mobile network as a high quality public land mobile network.

It is thereby advantageously possible according to the present invention that—instead of a value of the enhanced network selection criterion being different from the high quality criterion—simply (the conventionally known value of) the high quality criterion is applied during the network selection stage. Hence, there is no need to store (e.g. within the subscriber identity module of the user equipment) or to transmit (to the user equipment) an actual value of the enhanced network selection criterion; it is possible to simply apply the high quality criterion (being already known to the user equipment).

According to the present invention, for the public land mobile networks reported to correspond to suitable radio cells (in the cell selection stage), either the measured (during the cell selection stage) signal quality indicator is reported to the NAS or the indication that the considered public land mobile network is a high quality network (i.e. the respective measured signal quality indicator corresponds to or exceeds the high quality criterion). According to the present invention, the value of the enhanced network selection criterion preferably corresponds to a value above the respective cell selection criterion (i.e. in the direction of a better signal quality corresponding to the selection process in the cell selection stage) to be applied regarding the respective considered radio access technology. However, the value of the enhanced network selection criterion at most corresponds to the high quality criterion.

According to the present invention, it is advantageously furthermore possible and preferred that the user equipment has or is associated with a home public land mobile network (HPLMN), and wherein the enhanced network selection criterion comprises or takes into account a home-operator-controlled value being set or being able to be adjusted by the HPLMN or its operator, wherein the enhanced network selection criterion is especially more restrictive compared to the cell selection criterion lacking a home-operator-controlled component, wherein especially the enhanced network selection criterion is at most as restrictive as the high quality criterion, wherein especially the network selection and the application of the enhanced network selection criterion is triggered in case the corresponding reception conditions, as measured by the user equipment do not correspond to or do not exceed the cell selection criterion.

It is thereby advantageously possible that the home public land mobile network is able to influence the behavior of the user equipment, even though the user equipment is using a visited mobile communication network. For example, it is advantageously possible to user-equipment-individually (or groupwise) adjust the value of the enhanced network selection criterion in order to steer the network selection of those user equipments in such a manner that the required or intended communication services is able to be provided by whichever (home or visited or further) mobile communication network in a stable and reliable manner.

According to the present invention, it is advantageously furthermore possible and preferred that the home-operator-controlled value of the enhanced network selection criterion corresponds to:

an offset value being additionally applied compared to the cell selection criterion, or an absolute value.

It is thereby advantageously possible according to the present invention to flexible adjust and modify the home-operator-controlled value of the enhanced network selection criterion. Generally, the use of an offset value is probably preferred over the use of an absolute value; however, there might be (individual) cases or reception conditions such that the use of an absolute value might be preferable.

According to the present invention, it is furthermore advantageously possible and preferred that the home-operator-controlled value of the enhanced network selection criterion, or an indication to use the high quality criterion as the enhanced network selection criterion, is stored in the user equipment, especially within or as part of the subscriber identity module or of another secure element or part of the user equipment, and/or provided or transmitted to the user equipment, especially by the HPLMN or its operator, especially via using an over-the-air transmission method.

Via providing different possibilities and ways to modify and/or to store and/or transmit the home-operator-controlled value of the enhanced network selection criterion, it is advantageously possible according to the present invention to flexibly manage even an important number of user equipments, or a group of user equipments being used for different specific tasks, such as, e.g., internet-of-things devices or machine type communication devices.

Furthermore, it is advantageously possible and preferred according to the present invention that the determination, by the user equipment and in or during the second step, of mobile communication networks corresponding to suitable radio cells of a considered radio access technology being based on the enhanced network selection criterion is conducted after switching on the user equipment, or after recovery from lack of coverage, or at a network reselection triggered by the user, or periodically, in case the user equipment is in a visited communication network.

Furthermore, it is advantageously possible and preferred according to the present invention that in a third step, after the second step—in case that mobile communication networks are lacking that correspond to suitable radio cells of the considered radio access technology that have or correspond to reception conditions corresponding to or exceeding the enhanced network selection criterion—, network selection is continued based on the cell selection criterion instead of the enhanced network selection criterion.

Thereby, it is advantageously possible to finalize the network selection stage (after its initial phase as described above) via applying the conventionally known approach, i.e. applying the cell selection criterion which corresponds to use or to consider, regarding network selection, all suitable radio cells reported to the NAS (i.e. without only focusing only on the sub-set corresponding to or exceeding the enhanced network selection criterion as this is done, according to the present invention, initially in the network selection stage which corresponds to the second step according to a method according to the invention).

Furthermore, the present invention relates to a user equipment for realizing network selection within a radio environment comprising a plurality of radio cells of a plurality of mobile communication networks, each one of these radio cells being associated, respectively, to at least one mobile communication network of the plurality of mobile communication networks, wherein the user equipment is configured to measure or to detect reception conditions regarding the plurality of radio cells, and is configured to subsequently select and/or register to a mobile communication network out of the plurality of mobile communication networks, wherein regarding cell selection by the user equipment a cell selection criterion is defined.

wherein a radio cell of a considered radio access technology is considered to be a suitable radio cell in case that the corresponding reception conditions, as measured by the user equipment, correspond to or exceed the cell selection criterion regarding the considered radio access technology, wherein regarding network selection by the user equipment at least one predefined enhanced network selection criterion is able to be applied, wherein the user equipment is configured such that:

suitable radio cells of a considered radio access technology are determined by the user equipment based on the cell selection criterion regarding the considered radio access technology, upon initiating network selection according to the automatic network selection mode, only such mobile communication networks corresponding to suitable radio cells of the considered radio access technology are considered for network selection of the user equipment that have or correspond to reception conditions corresponding to or exceeding the enhanced network selection criterion.

Furthermore, the present invention relates to a system or mobile communication network for realizing cell selection by a user equipment being in a radio environment comprising a plurality of radio cells of a plurality of mobile communication networks, each one of these radio cells being associated, respectively, to at least one mobile communication network of the plurality of mobile communication networks, wherein the user equipment is configured to measure or to detect reception conditions regarding the plurality of radio cells, and is configured to subsequently select and/or register to a mobile communication network out of the plurality of mobile communication networks, wherein regarding cell selection by the user equipment a cell selection criterion is defined, wherein a radio cell of a considered radio access technology is considered to be a suitable radio cell in case that the corresponding reception conditions, as measured by the user equipment, correspond to or exceed the cell selection criterion regarding the considered radio access technology, wherein regarding network selection by the user equipment at least one predefined enhanced network selection criterion is able to be applied, wherein the system or the mobile communication network is configured such that:

suitable radio cells of a considered radio access technology are determined by the user equipment based on the cell selection criterion regarding the considered radio access technology, upon initiating network selection according to the automatic network selection mode, only such mobile communication networks corresponding to suitable radio cells of the considered radio access technology are considered for network selection of the user equipment that have or correspond to reception conditions corresponding to or exceeding the enhanced network selection criterion.

Additionally, the present invention relates to a program comprising a computer readable program code which, when executed on a computer and/or on a user equipment and/or on a network node of a mobile communication network, or in part on a user equipment and/or in part on network node of a mobile communication network, causes the computer and/or the user equipment and/or the network node of the mobile communication network to perform a method according to the invention.

Still additionally, the present invention relates to a computer-readable medium comprising instructions which when executed on a computer and/or on a user equipment and/or on a network node of a mobile communication network, or in part on a user equipment and/or in part on network node of a mobile communication network, causes the computer and/or the user equipment and/or the network node of the mobile communication network to perform a method according to the invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a user equipment 20 is schematically shown in a radio environment comprising a plurality of radio cells of a plurality of mobile communication networks. In the exemplary representation of FIG. 1, a first radio cell 11 is associated with or related to a first mobile communication network 100, a second radio cell 12 is associated with or related to a second mobile communication network 200, and a third radio cell 13 is associated with or related to a third mobile communication network 300.

Schematically, a base station entity is represented regarding each one of the three radio cells 11, 12, 13 that the user equipment 20 detects or "sees": A first base station entity 111 (typically but not necessarily of the first mobile communication network 100) generates or provides radio coverage of or regarding the first radio cell 11, a second base station entity 112 (typically but not necessarily of the second mobile communication network 200) generates or provides radio coverage of or regarding the second radio cell 12, and a third base station entity 113 (typically but not necessarily of the third mobile communication network 200) generates or provides radio coverage of or regarding the third radio cell 13.

In FIG. 1, the user equipment 20 is shown being located within the radio coverage area (illustrated via dashed circles) of the first radio cell 11, the second radio cell 12, as well as the third radio cell 13. The user equipment 20 measures or detects reception conditions regarding the plurality of radio cells 11, 12, 13, and subsequently selects and/or registers to a mobile communication network out of the plurality of mobile communication networks 100, 200, 300.

Figure 2:
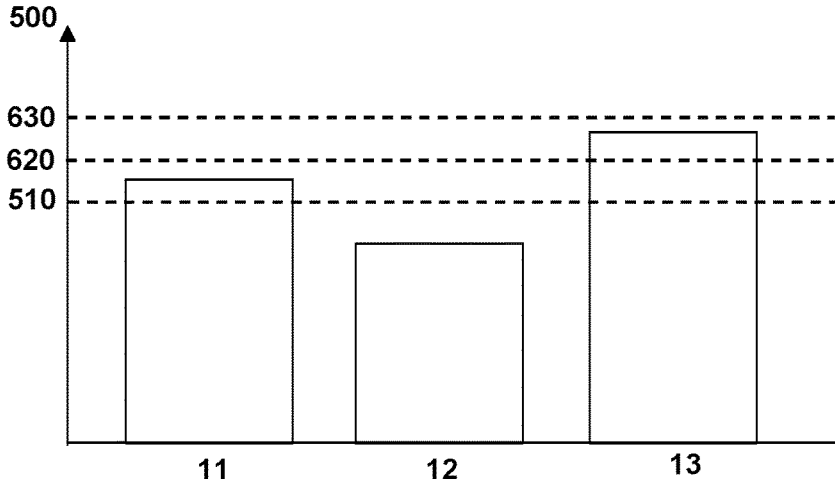
FIG. 2 schematically illustrates a situation of the user equipment measuring different signal strength of the different radio cells.

According to the present invention a cell selection criterion is defined that the user equipment 20 uses regarding cell selection. The cell selection criterion is schematically shown in FIG. 2 which represents a situation of the user equipment 20 measuring different signal strength of the different radio cells 11, 12, 13. The ordinate of the diagram shown corresponds to the signal strength 500 or an indicator thereof (such as a field strength value or signal quality parameter). According to mechanisms in conventionally known mobile communication networks, the user equipment 20 applies a conventionally defined cell selection criterion 510 in the cell selection stage. According to this (conventionally defined) cell selection criterion 510, both the first radio cell 11 and the third radio cell 13 would be regarded as suitable radio cells (according to or applying the cell selection criterion 510 in the cell selection stage, corresponding to the first step of a method according to the invention) as both radio cells 11, 13 are schematically shown as having or providing (at the location of the user equipment 20) a signal strength corresponding to or exceeding the cell selection criterion 510. According to the present invention, in the network selection stage (at least in its initial part, corresponding to the second step of a method according to the invention) an enhanced network selection criterion 620 is defined and taken into consideration when it comes to select a public land mobile network in the (first or initial part of the) network selection stage. As the enhanced network selection criterion 620 is typically more demanding or requires an increased reception signal level or quality (schematically indicated, in FIG. 2, via the enhanced network selection criterion 620 being represented above the conventionally defined cell selection criterion 510. i.e. the enhanced network selection criterion 620 is especially more restrictive compared to the conventionally defined cell selection criterion 510), only the third radio cell 13, or, rather, its associated public land mobile network 300, is considered, by the user equipment 20 and due to measurements conducted by the user equipment 20, to be taken into consideration in the first part of the network selection stage according to the present invention. A further criterion is schematically indicated in FIG. 2, corresponding to the high quality criterion 630. As previously mentioned, the enhanced network selection criterion 620 (regarding the respective radio access technology) corresponds to a signal strength or signal strength level in between the (conventionally used) cell selection criterion 510, and the high quality criterion 630. Hence, in the exemplary situation shown in FIG. 2, while both the first radio cell 11 and the third radio cell 13 are considered suitable radio cells in the cell selection stage, only the third radio cell 13 (or its corresponding public land mobile network 300) is considered (initially) in the network selection stage (as it is the only one (of the three radio cells represented) that the corresponding reception conditions, as measured by the user equipment 20, correspond to or exceed the enhanced network selection criterion 620 regarding the considered radio access technology. Both in FIG. 1 and in FIG. 2, only radio cells and mobile communication networks are shown without differentiating between different radio access technologies. However, it is to be understood that this also applies for different radio access technologies. e.g. the third radio cell 13 might exceed the enhanced network selection criterion 620 only regarding one specific radio access technology, but a radio cell of another radio access technology and also provided or generated by the third base station entity 113 might not exceed the respective enhanced network selection criterion 620 to be applied regarding the other radio access technology, and, perhaps, vice versa for the other radio cells 11, 12.

According to the present invention, the cell selection (i.e. the determination of suitable radio cells, by the user equipment 20 and based on the (conventionally defined) cell selection criterion 520 regarding the considered radio access technology) is done in a first step, and in a second step, upon initiating network selection according to the automatic network selection mode, only such mobile communication networks corresponding to suitable radio cells of the considered radio access technology are considered for network selection of the user equipment 20 that have or correspond to reception conditions corresponding to or exceeding the enhanced network selection criterion 620. Via thereby restricting the candidate networks or candidate public land mobile networks (at least in an initial phase of the network selection stage), a higher signal quality or performance of the user equipment 20 is able to be realized (if, in this initial phase of the network selection stage according to the present invention, a suitable higher quality public land mobile network is able to be found).

It is preferred according to the present invention that the high quality criterion 630 is used as the enhanced network selection criterion 620.

Additionally, especially according to the preferred embodiment according to which the user equipment 20 has or is associated with a home public land mobile network (HPLMN), and wherein the enhanced network selection criterion 620 comprises or takes into account a home-operator-controlled value being set or being able to be adjusted by the HPLMN or its operator, it is advantageously possible according to the present invention, that the home operator is able to influence the network selection process of the user equipment 20. The enhanced network selection criterion 620 is especially more restrictive compared to the cell selection criterion 510, or, rather, compared to considering, from the beginning of the network selection stage, all reported public land mobile networks corresponding to reported suitable radio cells. As already said, the enhanced network selection criterion 620 is especially at most as restrictive as the high quality criterion 630.

According to the present invention, it is advantageously possible that—at least initially—, by considering only such radio cells or corresponding public land mobile networks at or above the enhanced network selection criterion 620 as target networks, the network selection stage is performed differently than conventionally known. According to the present invention, it is not necessarily required that all user equipments (e.g. of a group of user equipments having, for example, internet-of-things functionality or the like) are necessarily applying—via applying (a definition of a network selection criterion based on) the enhanced network selection criterion 620—a value as network selection criterion different from the conventionally defined cell selection criterion 510 (i.e. taking into consideration, for network selection, all suitable radio cells): Via defining the enhanced network selection criterion 620 differently from the conventionally performed network selection process—and especially via the enhanced network selection criterion 620 comprising or taking into account a home-operator-controlled value being set or being able to be adjusted by the HPLMN or its operator—it is advantageously possible for the home operator (or the operator of the HPLMN. i.e. the operator to which the user equipment 20 "belongs") to influence the behavior of the user equipment 20, especially the behavior of a part of a group of user equipments in a flexible manner. In an example, this is further detailed in the following: If, for example, a group of, say. 1000 user equipments is deployed regarding a specific task such as providing a measurement value or the like, and in case that, e.g., 900 of these 1000 user equipments are able to be used and functioning without any problems based on implementing the present invention. i.e. using, as a network selection criterion, the enhanced network selection criterion 620 (instead of using or taking into consideration all of the reported suitable radio cells, obtained based on the conventionally defined cell selection criterion 510), wherein, however and despite the (new) definition of the enhanced network selection criterion 620, the actual (field strength) value to compare with might correspond to the same value (e.g. in dB, i.e. if the enhanced network selection criterion 620 is defined as comprising an additional summand compared to the conventionally defined cell selection criterion 510, wherein, however, the additional summand amounts to zero (e.g. dB)), then there is no need to apply any modification regarding those 900 functioning user equipments (especially there is no need to artificially apply a different network selection value compared to the conventionally defined cell selection criterion 510). However, regarding to the residual 100 user equipments (which are not necessarily completely functional), the present invention provides the possibility—via the proposed modified definition of the network selection criterion. i.e. the enhanced network selection criterion 620—for the home public land mobile network to apply a more restrictive network selection criterion (compared to using or considering all reported suitable radio cells, based on the conventionally defined cell selection criterion 510), leading to a reduced rate of failures of such user equipments when communicating with the respective mobile communication network they are connected to.

According to the present invention, since only (mobile communication) networks having passed the network selection criterion (to apply) are considered initially in the network selection process, there is preferably only a modification regarding the initial part of the network selection process (i.e. corresponding to the second step of a method according to the invention). However, if—in this initial part of the network selection process—no public land mobile network is found, the later part of the network selection process (i.e. corresponding to the third step according to a method according to the invention) and all subsequent specified procedures regarding network selection can remain unchanged while achieving the desired behavior.

According to the present invention, a new initial stage or part (second step of a method according to the invention) of the network selection process is introduced and applied. i.e. a new, radio technology dependent, selection level (enhanced network selection criterion 620; either in the form of absolute values or in the form of offset values, per radio access technology), which can be provided via signaling from the HPLMN or retrieved from a respective field on the SIM maintained by the HPLMN. This selection level or these selection levels is/are applied to the networks in the PLMN lists during the selection process.

The new selection levels (NSL, or enhanced network selection criterion 620) are able to be stored as absolute numbers or as offset values with regard to either the high quality level (high quality criterion 630) or the cell selection criterion (conventionally used cell selection criterion 510). The new selection levels (enhanced network selection criterion 620) should only be applied when they are in the range between the HQ level (high quality criterion 630) and the cell selection criterion (conventionally used cell selection criterion 510). This ensures that no changes are needed on the lower layers (i.e. the AS-access stratum), as the information (i.e. the signal quality indication based on the measurements performed by the user equipment 20) conventionally reported to the NAS is sufficient.

The variant of providing an offset (i.e. an additional value to add to the definition of the conventionally defined cell selection criterion 510 or to subtract from the definition of the high quality criterion 630) to apply or use in the new initial stage or part (second step of a method according to the invention) of the network selection process is preferred. After the new initial stage or part (second step of a method according to the invention) of the network selection process according to the present invention, the network selection procedure might remain unchanged with regard to the conventional later network selection process, as in this later network selection process all reported suitable radio cells are taken into consideration.

According to the present invention, the network selection stage is initiated as follows:
    at switch on or recovery from lack of coverage, the last registered PLMN with a higher field strength than the NSL (enhanced network selection criterion 620) or an EPLMN (equivalent public land mobile network) to the last registered PLMN with a field strength greater than the NSL (enhanced network selection criterion 620) or as an option configured on the SIM either the HPLMN with field strength greater than NSL (enhanced network selection criterion 620) or the highest priority EHPLMN with field strength greater than NSL (enhanced network selection criterion 620) that is available, is selected;
    if no such network is available or in the case of reselection the further steps are:
        either the HPLMN with field strength greater than NSL (enhanced network selection criterion 620) or the highest priority EHPLMN with field strength greater than NSL (enhanced network selection criterion 620) that is available;

each PLMN/access technology combination with field strength greater than NSL (enhanced network selection criterion 620) in the "User Controlled PLMN Selector with Access Technology" data file in the SIM (in priority order);
each PLMN/access technology combination with field strength greater than NSL (enhanced network selection criterion 620) in the "Operator Controlled PLMN Selector with Access Technology" data file in the SIM (in priority order) or stored in the ME (in priority order)
other PLMN/access technology combinations with received "high quality" signal in random order.
In case that no network is available that fulfils the above criteria the further procedure of the network selection stage is especially to apply the conventionally known procedure, i.e. as follows:
    at switch on or recovery from lack of coverage the last registered PLMN or an EPLMN to the last registered PLMN or as an option configured on the SIM either the HPLMN or the highest priority EHPLMN that is available, is selected;
    then:
        either the HPLMN or the highest priority EHPLMN that is available;
        each PLMN/access technology combination in the "User Controlled PLMN Selector with Access Technology" data file in the SIM (in priority order);
        each PLMN/access technology combination in the "Operator Controlled PLMN Selector with Access Technology" data file in the SIM (in priority order) or stored in the ME (in priority order);
        other PLMN/access technology combinations in order of decreasing signal quality.

As already mentioned, according to an embodiment of the present invention, the high quality criterion is applied as the enhanced network selection criterion 620 during the initial stage or phase of the network selection process. As such, no new parameters on the SIM are needed, and only the network selection process is changed in the same way as mentioned above (i.e. with the NSL (enhanced network selection criterion 620) replaced by the high quality criterion. According to a further variant of this embodiment, a control flag (i.e. an indication essentially carrying one bit of information) is additionally introduced to control whether the network selection process follows or applies the new procedure according to the present invention or the conventionally known procedure. The control flag is especially provided via signaling from the HPLMN or retrieved from a respective field on the SIM maintained by the HPLMN.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for network selection, comprising:

determining, by a user equipment in a radio environment comprising a plurality of radio cells of a plurality of mobile communication networks, suitable radio cells of a considered radio access technology based on the cell selection criterion regarding the considered radio access technology, wherein each of the plurality of radio cells is associated, respectively, to at least one mobile communication network of the plurality of mobile communication networks, and wherein determining the suitable radio cells of the respective radio access technology comprises:

measuring or detecting, by the user equipment, reception conditions regarding the plurality of radio cells; and determining whether respective radio cells of the plurality of radio cells meet or exceed a cell selection criterion, wherein a respective radio cell is considered to be a suitable radio cell based on its respective reception conditions meeting or exceeding the cell selection criterion; and initiating, by the user equipment, network selection according to an automatic network selection mode, wherein in the automatic network selection mode, the user equipment only considers respective mobile communication networks corresponding to respective suitable radio cells of the considered radio access technology that have or correspond to reception conditions meeting or exceeding an enhanced network selection criterion, wherein the network selection criterion used in the automatic network selection mode is more restrictive than the cell selection criterion used in the determination of suitable radio cells.

2. The method according to claim 1, wherein the enhanced network selection criterion corresponds to a high quality criterion, wherein the high quality criterion corresponds to:

regarding global system for mobile communication (GSM) as radio access technology: a respective signal level associated with a high quality reception of a public land mobile network according to the 3GPP standardization; or regarding UMTS Terrestrial Radio Access Network (UTRAN), evolved UMTS Terrestrial Radio Access (E-UTRA), narrow-band internet-of-things (NB-IoT), or new radio (NR) in 5G systems: a respective signal level associated with the high quality criterion according to the 3GPP standardization, triggering the reporting, at the cell selection stage, of a respective public land mobile network as a high quality public land mobile network.

3. The method according to claim 1, wherein the user equipment has or is associated with a home public land mobile network (HPLMN):

wherein the enhanced network selection criterion comprises or takes into account a home-operator-controlled value set or adjustable by the HPLMN or its operator; and wherein the cell selection criterion lacks a home-operator-controlled component.

4. The method according to claim 3, wherein the home-operator-controlled value of the enhanced network selection criterion corresponds to:

an offset value added to the cell selection criterion; or an absolute value.

5. The method according to claim 3, wherein the home-operator-controlled value of the enhanced network selection criterion is:

stored in the user equipment within or as part of a subscriber identity module or another secure element or part of the user equipment; and/or provided or transmitted to the user equipment by the HPLMN or its operator, via an over-the-air transmission method.

6. The method according to claim 1, further comprising:

determining mobile communication networks of the considered radio access technology based on the enhanced network selection criterion, wherein determining the mobile communication networks of the considered radio access technology based on the enhanced network selection criterion is conducted:

after switching on the user equipment;

after recovery from lack of coverage;

at a network reselection triggered by a user; or periodically in case the user equipment is in a visited communication network.

7. The method according to claim 1, further comprising:

based on the user equipment not finding mobile communication networks that correspond to suitable radio cells of the considered radio access technology that have or correspond to reception conditions meeting or exceeding the enhanced network selection criterion, continuing, by the user equipment, network selection based on the cell selection criterion instead of the enhanced network selection criterion.

8. A user equipment in a radio environment comprising a plurality of radio cells of a plurality of mobile communication networks, comprising:

a processor; and a memory having instructions stored thereon;

wherein based on the processor executing the instructions, the user equipment is configured to:

determine suitable radio cells of a considered radio access technology based on the cell selection criterion regarding the considered radio access technology, wherein each of the plurality of radio cells is associated, respectively, to at least one mobile communication network of the plurality of mobile communication networks, and wherein determining the suitable radio cells of the respective radio access technology comprises:

measuring or detecting reception conditions regarding the plurality of radio cells; and determining whether respective radio cells of the plurality of radio cells meet or exceed a cell selection criterion, wherein a respective radio cell is considered to be a suitable radio cell based on its respective reception conditions meeting or exceeding the cell selection criterion; and initiate network selection according to an automatic network selection mode, wherein in the automatic network selection mode, the user equipment only considers respective mobile communication networks corresponding to respective suitable radio cells of the considered radio access technology that have or correspond to reception conditions meeting or exceeding an enhanced network selection criterion, wherein the network selection criterion used in the automatic network selection mode is more restrictive than the cell selection criterion used in the determination of suitable radio cells.

9. A system, comprising:

a plurality of mobile communication networks; and a user equipment in a radio environment comprising a plurality of radio cells of the plurality of mobile communication networks, wherein each of the plurality of radio cells is associated, respectively, to at least one mobile communication network of the plurality of mobile communication networks;

wherein the user equipment is configured to:

determine suitable radio cells of a considered radio access technology based on the cell selection criterion regarding the considered radio access technology, wherein each of the plurality of radio cells is associated, respectively, to at least one mobile communication network of the plurality of mobile communication networks, and wherein determining the suitable radio cells of the respective radio access technology comprises:

measuring or detecting reception conditions regarding the plurality of radio cells; and determining whether respective radio cells of the plurality of radio cells meet or exceed a cell selection criterion, wherein a respective radio cell is considered to be a suitable radio cell based on its respective reception conditions meeting or exceeding the cell selection criterion; and initiate network selection according to an automatic network selection mode, wherein in the automatic network selection mode, the user equipment only considers respective mobile communication networks corresponding to respective suitable radio cells of the considered radio access technology that have or correspond to reception conditions meeting or exceeding an enhanced network selection criterion, wherein the network selection criterion used in the automatic network selection mode is more restrictive than the cell selection criterion used in the determination of suitable radio cells.

10. A non-transitory computer-readable medium having processor-executable instructions stored thereon for network selection, wherein the processor-executable instructions, when executed, facilitate performance of the following-steps:

determining, by a user equipment in a radio environment comprising a plurality of radio cells of a plurality of mobile communication networks, suitable radio cells of a considered radio access technology based on the cell selection criterion regarding the considered radio access technology, wherein each of the plurality of radio cells is associated, respectively, to at least one mobile communication network of the plurality of mobile communication networks, and wherein determining the suitable radio cells of the respective radio access technology comprises:

measuring or detecting, by the user equipment, reception conditions regarding the plurality of radio cells; and determining whether respective radio cells of the plurality of radio cells meet or exceed a cell selection criterion, wherein a respective radio cell is considered to be a suitable radio cell based on its respective reception conditions meeting or exceeding the cell selection criterion; and initiating, by the user equipment, network selection according to an automatic network selection mode, wherein in the automatic network selection mode, the user equipment only considers respective mobile communication networks corresponding to respective suitable radio cells of the considered radio access technology that have or correspond to reception conditions meeting or exceeding an enhanced network selection criterion, wherein the network selection criterion used in the automatic network selection mode is more restrictive than the cell selection criterion used in the determination of suitable radio cells.

* * * * *